United States Patent
Kameyama et al.

(10) Patent No.: US 6,327,435 B1
(45) Date of Patent: Dec. 4, 2001

(54) FOCUS ADJUSTING APPARATUS

(75) Inventors: Makoto Kameyama; Etsuro Furutsu, both of Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/430,933

(22) Filed: Nov. 1, 1999

(30) Foreign Application Priority Data

Nov. 4, 1998 (JP) .................................................. 10-313242

(51) Int. Cl.⁷ .................................................. G03B 13/36
(52) U.S. Cl. ............................ 396/96; 396/106; 396/121
(58) Field of Search ............................ 396/96, 106, 121, 396/122, 123, 104

(56) References Cited

U.S. PATENT DOCUMENTS 4,618,235 * 10/1986 Ishida et al. ............................ 396/96
6,038,405 * 3/2000 Kageyama ........................ 396/123 X
6,115,555 * 9/2000 Ueda et al. ........................ 396/121 X

* cited by examiner

*Primary Examiner*—W. B. Perkey
(74) *Attorney, Agent, or Firm*—Robin, Blecker & Daley (57) ABSTRACT

The present invention relates, in a camera including multiple points type focus detecting means, to the camera for carrying out the proper control for a time for accumulation when detecting a focus by adopting fill-in light. In particular, the invention provides a camera which is designed in such a way that in the control for the time for accumulation for the focus detection without the emission of the fill-in light, the maximum time for the accumulation is determined in accordance with the accumulation time in a sensor in which the accumulation operation control has been most early completed, while for the focus detection in a state in which the fill-in light is being applied to an object, the maximum time for the accumulation is determined irrespective of the accumulation time in a sensor in which the accumulation operation control has been most early completed.

6 Claims, 7 Drawing Sheets

X COORDINATE
0 1 2 3 4 5 6 7 8 9 10 11 12 13 14 15 16 17 18 19 20

Y COORDINATE
0
1
2
3
4

FOCUS ADJUSTING APPARATUS

BACKGROUND OF THE INVENTION

1. Field of the Invention

The present invention relates to an apparatus for adjusting automatically a focus for use in a camera or the like.

2. Related Background Art

For a focus detecting apparatus of a camera, there is known the method in which a luminous flux which has been emitted from an object to pass through a photographing lens is received by a charge-accumulated type photoelectric conversion device such as a CCD to be accumulated with the electric charges thereof, and an accumulated output signal is amplified in accordance with the luminance of the object at this time, while when it is judged due to the low luminance or low contrast state that the detection of the focus is impossible, the reaccumulation is carried out with the object irradiated with the fill-in light emitted from a fill-in light source, and the focus state of the photographing lens is detected on the basis of the output therefrom.

In addition, there is well known a focus detecting camera of a multiple-points type which serves to detect the focus states for a plurality of areas within an image plane to carry out, on the basis of the detection result, the focus adjustment for a photographing lens.

In addition, as for the method of selecting between detection points in order to detect the focus state of the main object portion on the basis of a plurality of focus detection points, there are the method in which a photographing person selects the detection point by utilizing an electric dial or an apparatus for detecting a line of sight, and the method in which a camera selects automatically the detection point on the basis of the focus states of all of the detection points.

In the method of detecting the focus on the basis of the luminous flux emitted from an object, the speed of detecting the focus is in proportion to the speed of accumulating the electric charges in a photoelectric conversion device constituting the detection point. For this reason, when the detection point is automatically selected by the multiple-points type focus detecting camera having a plurality of detection points, such a problem frequently occurs that since the area having the low luminance is contained in the picture though an object has the sufficiently high luminance, it takes a lot of time to complete the accumulation of the electric charges of all of the detection points, or the accumulation is not completed if the worst comes to the worst.

In order to cope with such a problem, in the mode of selecting automatically a detection point in the multiple-points type focus detecting camera, the maximum time for the accumulation of the electric charges for all of the detection points is limited on the basis of the time for the accumulation of the electric charges of the detection point at which the detection of the focus has been most early completed.

Therefore, even if the accumulation of the electric charges in the detection points at each of which the focus state is detected for the main object is not yet completed within the maximum time for the accumulation, the detection point will be selected by using only the detection points at each of which the accumulation has been completed within that time period.

In addition, the judgement that the object has the low luminance is generally carried out on the basis of the electric charge accumulation time at the selected detection point. But, when the detection point is automatically selected, in general, the luminance of the image plane is judged on the basis of the number of detection points at each of which the accumulation has been completed within the maximum time for the accumulation and the positions thereof.

However, in the conventional focus detecting apparatus as described above, the following problems arise.

When photographing an object having the low luminance with the scenery containing the high luminance point source as the background, since the accumulation of the electric charges at the detection point of the object portion having the low luminance as the main object becomes less, it is impossible to detect the focus of the main object.

That is, in the case where the detection point is automatically selected when photographing a person who has the relatively low luminance as compared with the high luminance point source of the background with the scenery containing the high luminance point source such as a night scene as the background, since the overall image plane has the low luminance, the light emitted from the fill-in light source is irradiated to the person as the object.

However, the high luminance point source of the background may have the higher luminance than that of the person as the object irradiated with the fill-in light in many cases. For this reason, there arises the problem that since the high luminance point source of the background completes most early the accumulation of the electric charges, the maximum time for the accumulation is limited and hence even by irradiating the fill-in light emitted from the fill-in light source, the focus of the main object cannot be surely detected.

Figure 8:
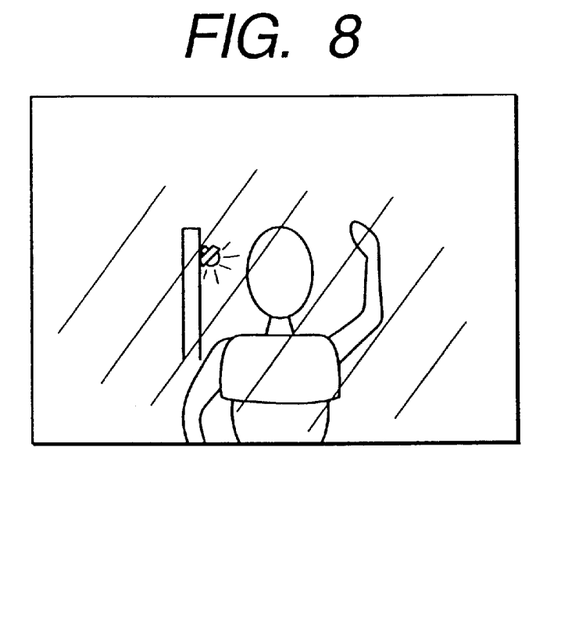
FIG. 8 is a schematic view for explaining the image state in the finder in the case where a person having low luminance is photographed when the background contains a high luminance point light source.
Figure 9:
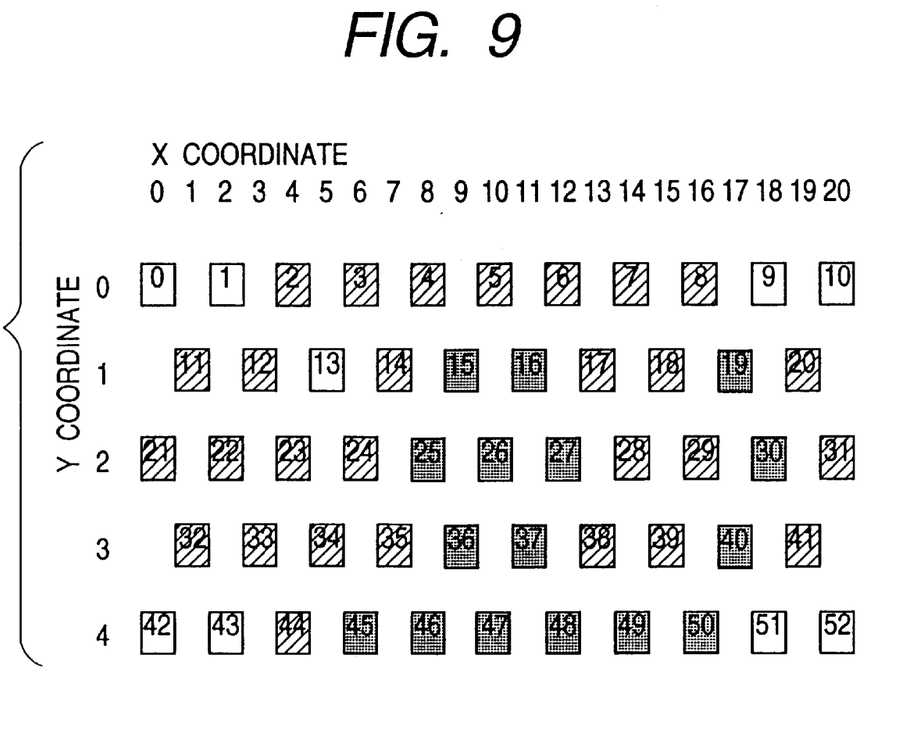
FIG. 9 is a schematic view showing the distribution state of the luminance in focus detecting sensors when photographing the image state shown in FIG. 8.

For example, as shown in FIG. 8, in the case where when photographing a person at night, the background of the person as the object having the low luminance contains the high luminance light source such as a streetlight which is located in the distance, the distribution of the luminance of the focus detection points is as shown in FIG. 9. At this time, if even when the object is irradiated with the fill-in light, the streetlight of the background is sufficiently bright, the maximum time for the accumulation at other detection points is limited in correspondence to the time for the accumulation at the detection point of No. 13 of FIG. 9 (a portion at which the street light is detected). Therefore, the detection of the focus based on the detection point of the person object portion will not be ensured. In addition, if the limit of the maximum time for the accumulation is not carried out in order to solve that problem, there is the possibility that even during the photographing in the bright daytime, the time for the accumulation becomes long, and hence the response of the detection of the focus is reduced.

SUMMARY OF THE INVENTION

According to one aspect of the application, there is provided a focus adjusting apparatus or a camera for adjusting automatically a focus including a focus detecting circuit for carrying out a signal accumulation in each of the sensor portions by using a plurality of signal accumulation type sensor portions so as to detect the focus states for a plurality of areas on the basis of signals from the sensor portions in each of which the signal accumulation has already been completed, the focus adjustment being carried out on the basis of the focus states which have been detected by the circuit, the apparatus or camera including:

an accumulation time limiting circuit which completes, even if the accumulation in the sensor portions have not yet been completed, the accumulation for the sensor portions, the accumulation time limiting circuit including, as modes thereof, a first mode in which an accumulation completed time of the accumulation operation for the plurality of sensor portions in the state of applying no light to an object is controlled, and a second mode in which an accumulation completed time of the accumulation operation for the plurality of sensor portions in a state of applying a light to the object is controlled; and an accumulation completed time determining circuit which determines the completed time provided by the accumulation time limiting circuit by utilizing manners different in the first and second modes.

According to one aspect of the application, the apparatus or the camera may provide that the accumulation completed time determining circuit determines, in the first mode, the completed time with as a factor the time for the accumulation in the sensor portions in each of which the accumulation operation has already been completed when the accumulation operation is being carried out, and in the second mode, determines the completed time irrespective of the time for the accumulation in the sensor portions in each of which the accumulation operation has already been completed.

According to one aspect of the application, the apparatus or the camera may provide that the accumulation completed time determining circuit determines the truncating time with as a factor the time for the accumulation in the sensor portion in which the accumulation operation has been completed most early in the first mode.

According to one aspect of the application, the apparatus or the camera may provide that the accumulation completed time in the second mode is set longer than that in the first mode.

According to one aspect of the application, there is provided a focus adjusting apparatus or a camera for adjusting automatically a focus including a focus detecting circuit which carries out the signal accumulation in each of the sensor portions by using a plurality of signal accumulation type sensor portions so as to detect the focus states for a plurality of areas on the basis of signals from the sensor portions in each of which the signal accumulation has already been completed, the focus adjustment being carried out on the basis of the states which have been detected by the circuit, the apparatus or the camera including:

an accumulation time limiting circuit which completes, even if the accumulation in the sensor portions have not yet been completed, the accumulation for the sensor portions, the accumulation time limiting circuit including, as modes thereof, a first mode in which an accumulation completed time of the accumulation operation for the plurality of sensor portions in the state of applying no light to an object is controlled, and a second mode in which an accumulation completed time of the accumulation operation for the plurality of sensor portions in a state of applying the light to the object is controlled, wherein the accumulation completed time in the second mode provided by the accumulation time limiting circuit is set longer than that in the first mode provided by the accumulation time limiting circuit.

The above and other objects, features and advantages of the present invention will become more apparent from the description of the preferred embodiments taken in conjunction with the accompanying drawings.

DESCRIPTION OF THE PREFERRED EMBODIMENTS

The preferred embodiment of the present invention will hereinafter be described in detail with reference to the accompanying drawings.

Figure 1:
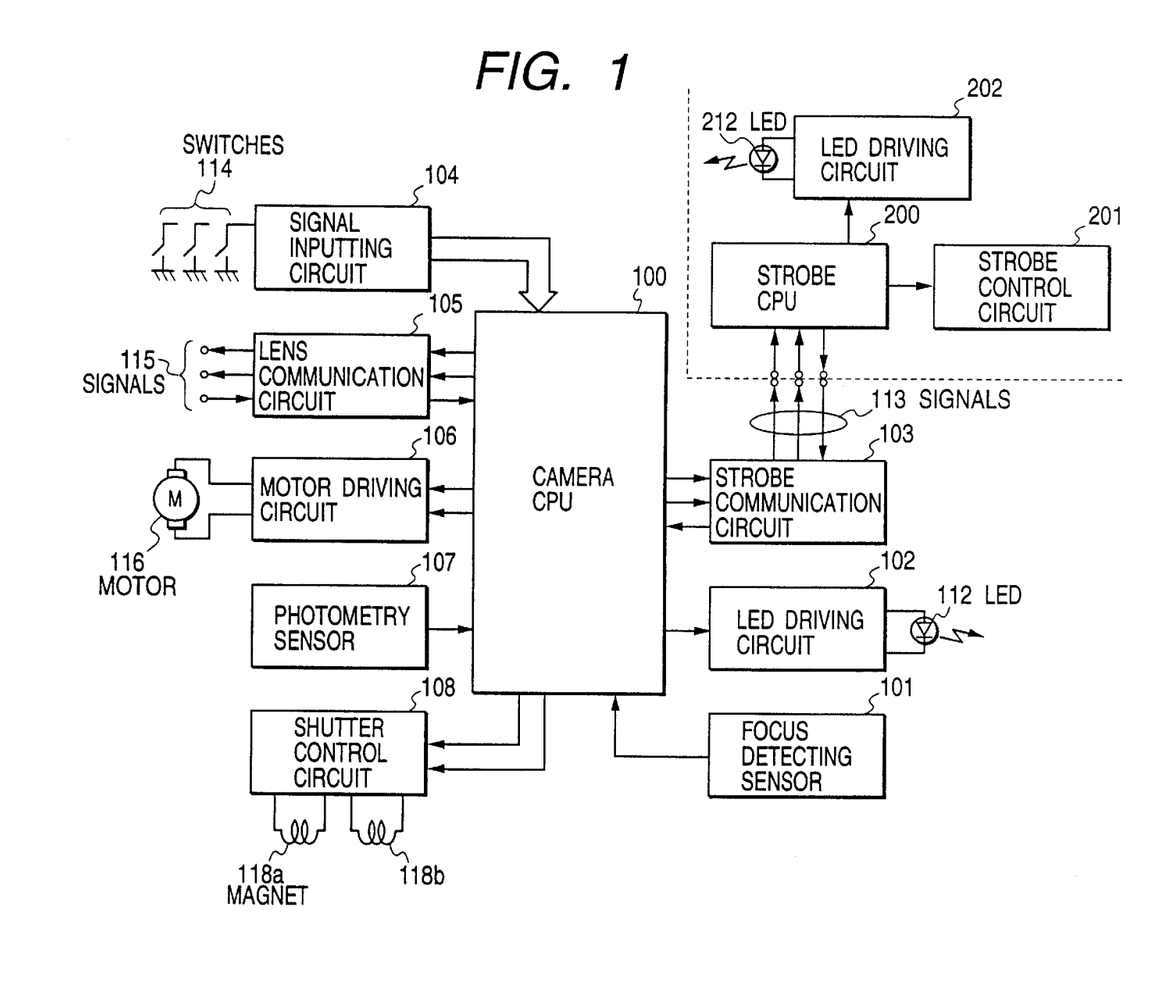
FIG. 1 is a block diagram showing a configuration of a circuit of a camera according to an embodiment of the present invention.

FIG. 1 is a block diagram showing a configuration of a circuit of a camera according to an embodiment of the present invention.

In the figure, a microcomputer 100 for a camera (hereinafter, referred to as "a camera CPU" for short, when applicable) is connected to a signal inputting circuit 104 for detecting the operation states of various operational switches 114 of the camera, a motor driving circuit 106 for driving a film feeding motor 116, a photometry sensor 107, a shutter control circuit 108 for controlling the operation of shutter magnets 118a and 118b, a sensor 101 for detecting a focus, and an LED driving circuit 102 serving as a fill-in light source driving circuit for driving an LED 112 serving as fill-in light emitting means.

In addition, signals 115 are transmitted from the CPU 100 to a photographing lens (not shown) through a lens communication circuit 105 so as to perform focus adjustment or aperture control.

Further, the CPU 100 transmits/receives signals 113 to/from a strobo CPU 200 through a strobo communication circuit 103.

In accordance with an instruction issued from the camera CPU 100, the strobo CPU 200 controls a strobo control circuit 201 in order to obtain the stroboscopic light emission and also drives a strobo side fill-in light LED 212 using an LED driving circuit 202.

The setting of the various modes of the camera is determined on the basis of the setting of the states of the switches 114.

In this connection, the details of the photometry sensor 107, the shutter control circuit 108, the motor driving circuit 106 and the lens communication circuit 105 are not directly related to the present invention, and hence the more detailed description thereof is omitted here for the sake of simplicity.

The CPU 100 self-contains a ROM in which a program used to control the camera operation is stored, a RAM for storing therein variables, and an EEPROM (electrically erasable and programmable ROM) for storing therein various parameters.

Figure 2:
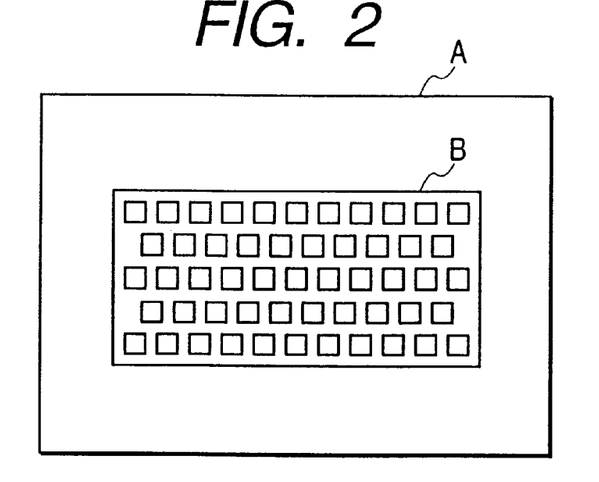
FIG. 2 is a schematic view showing the inside of a finder of the camera shown in FIG. 1.
Figure 3:
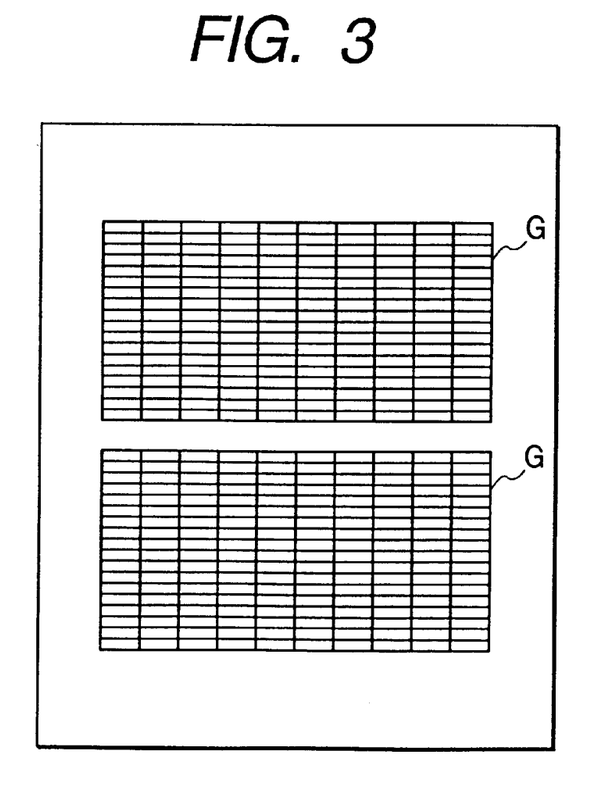
FIG. 3 a schematic view showing the structure of a focus detecting sensor which is included in the camera shown in FIG. 1.

Each of FIGS. 2 and 3 is a schematic view showing the details of the focus detecting sensor 101.

While in the present embodiment, in order to aim at extending the detection area, the focus detecting unit employing a photoelectric conversion device having a two-dimensionally spreading photoelectric receiving portion, i.e., the area sensor is used, alternatively, a large number of plural line sensors may be arranged.

FIG. 2 shows a detection area (B) of a photographed image plane A in the focus detecting unit employing the area sensor.

The focus detection points are shown, in the form of the points which are latticedly arranged, in the inside of the detection area (B).

The photoelectric conversion device employed in the area sensor becomes, if the phase difference detecting method is implemented, an area sensor pair G in which two areas are arranged as shown in FIG. 3.

In this connection, the detailed configuration of the accumulation control system and the focus detection system for that area sensor pair G is described in detail in Japanese Patent Application Laid-open No. 10-104503, and hence the description thereof is omitted here for the sake of simplicity.

In addition, the fill-in light applying optical system employing the fill-in light LEDs 112 and 212 is described in detail in Japanese Pat. Application Laid-open Nos. 9-054242 and 7-191260, and hence the description thereof is omitted here for the sake of simplicity.

Figure 4:
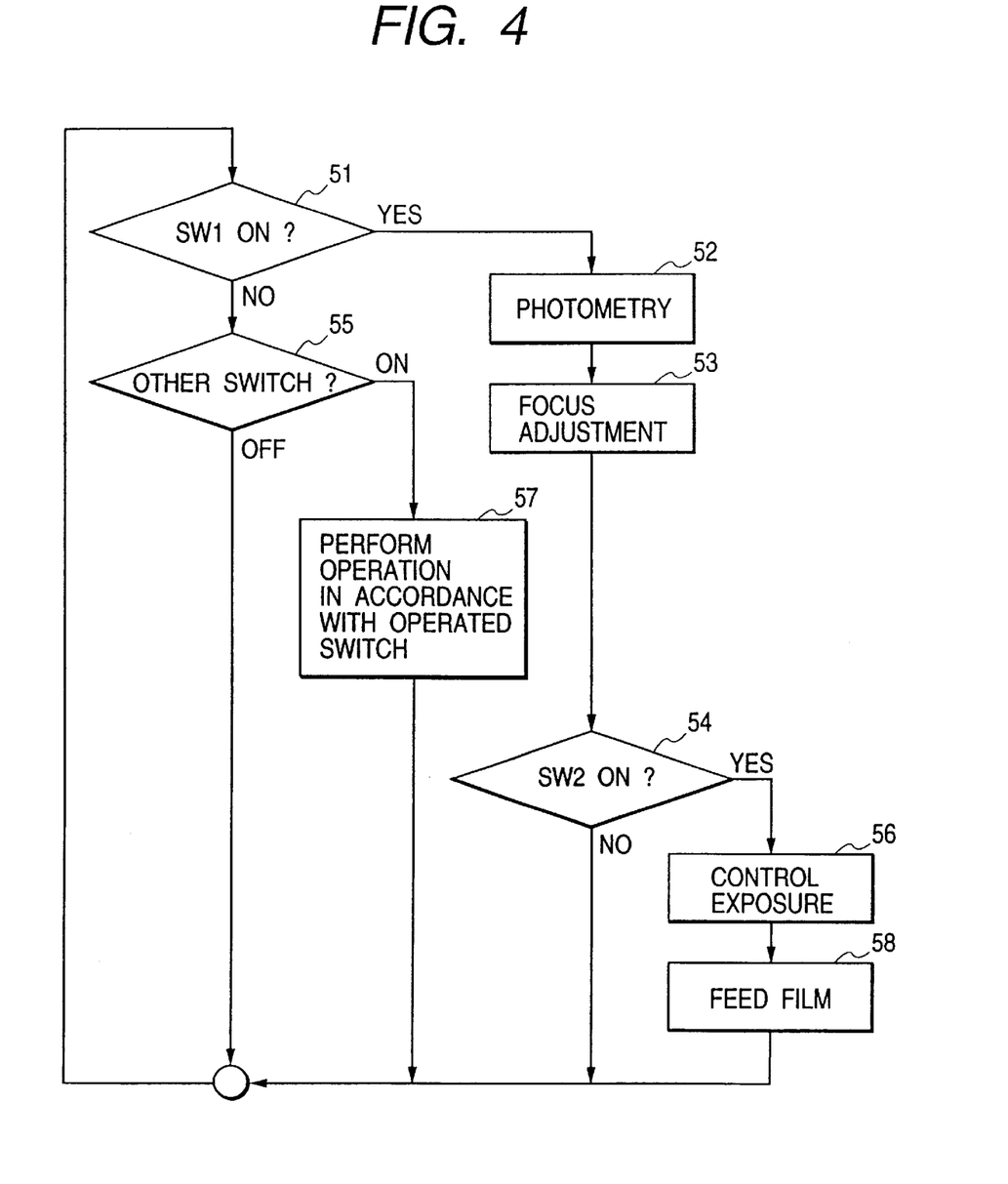
FIG. 4 is a flow chart for explaining the control flow in the camera shown in FIG. 1.

Next, the operation of the camera will hereinbelow be described in detail. FIG. 4 is a flow chart for explaining the operation of the camera CPU 100 shown in FIG. 1, and the operation of the overall camera will now be described using this flow chart.

The camera CPU 100 starts, when starting the operation, the operation from Step 51 shown in FIG. 4.

In Step 51, it is judged whether or not a switch SW1 by which the photometry and the focus detecting operations are started and which is turned ON on the basis of a first stroke depression of a release button has already been turned ON. If it is judged in Step 51 that the switch SWl has already been turned ON, then the processing proceeds to Step 52. On the other hand, if it is judged in Step 51 that the switch SWl is not yet turned ON, then the processing branches to Step 55.

In Step 55, it is judged whether or not other switches (such as a feeding mode switch, and a switch by which the area is specified in which the focus is detected in FIG. 1) have been turned ON. If it is judged in Step 55 that other switches have been turned ON, then the processing branches to Step 57. On the other hand, if it is judged in Step 55 that other switches are in the OFF state, then the processing is returned back to Step 51 in which the switch SW1 is checked again.

In this connection, in the present embodiment, the description is given with respect to the operation in the mode of selecting automatically the focus detection point, and hence the detailed description with respect to the operation in the mode in which a photographing person selects arbitrarily the focus detection point is omitted here for the sake of simplicity.

In Step 57, the processing corresponding to the switches each of which is in the ON state (the processing of setting the feeding mode, specifying the focus detection area and so forth) is executed.

In Step 52, in order to determine the amount of exposure, the photometry sensor 107 (refer to FIG. 1) is operated to measure the amount of light from an object and to carry out the photometry. Then, the processing proceeds to Step 53.

In Step 53, the focus position of the object is detected to move the photographing lens to the focus position to carry out the focus adjustment (the focus adjustment operation). Then, the processing proceeds to Step 54 (the details of the operation of detecting the focus will be described later).

In Step 54, it is judged whether or not a release switch SW2 which will be turned ON by the second stroke depression for the above-mentioned release button has already been turned ON. If it is judged in Step 54 that the release switch SW2 has already been turned ON, then the processing proceeds to Step 56. On the other hand, if it is judged in Step 54 that the release switch SW2 is not yet turned ON, then the processing is returned back to Step 51.

In Step 56, in order to carry out the exposure operation, the aperture of the lens is, first of all, stopped down to the value for the aperture which has already been determined on the basis of the photometry value obtained in Step 52, and then the shutter is opened for a predetermined time period to carry out the exposure operation by controlling the shutter. After the shutter control is completed, the state of the aperture is returned back to the release position. Then, the processing proceeds to Step 58.

In Step 58, the film is fed from the exposed frame to the next frame. Then, the processing is returned back to Step 51 to complete the series of operations.

Figure 5:
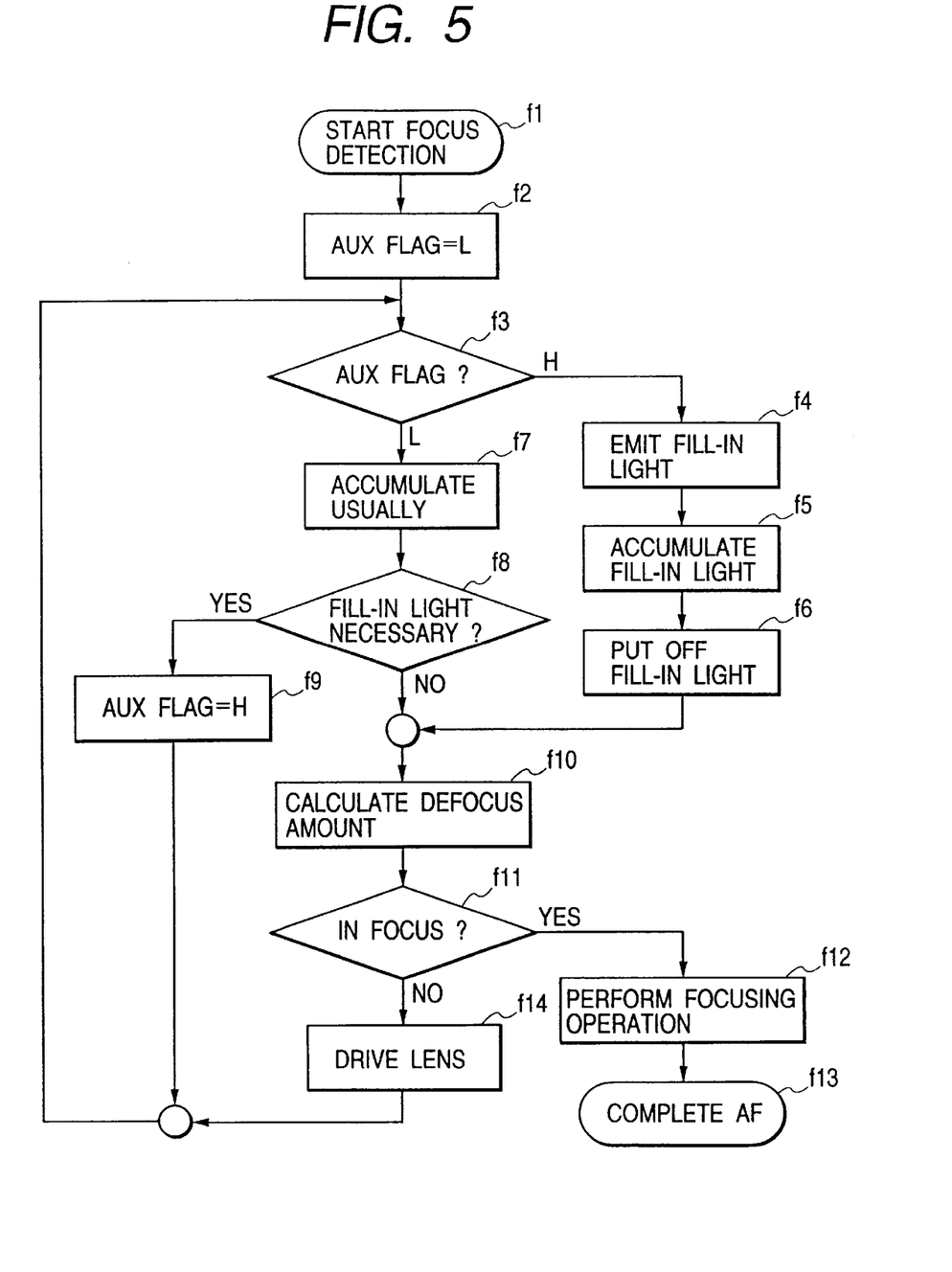
FIG. 5 is a flow chart for explaining the focus adjustment routine shown in FIG. 4.

FIG. 5 is a flow chart for explaining "the focus adjustment" as the subroutine shown in Step 53 of FIG. 4. The description will hereinbelow be given with respect to the focus detection and focus adjustment operation with reference to the flow chart shown in FIG. 5.

In Step f1, at the time when the subroutine has been called, the program starts the execution from Step f1.

In Step f2, a fill-in light use flag (AUX flag), a flag which is used to carry out the focus detection and the variables are all initialized. Then, the processing proceeds to Step f3.

In Step f3, it is judged on the basis of "the AUX flag" whether or not the fill-in light should be used. If "the AUX flag" is "H", i.e., it is judged in Step f3 that the fill-in light should be used, the processing branches to Step f4. On the other hand, if "the AUX flag" is "L", i.e., it is judged in Step f3 that the fill-in light should not be used, then the processing proceeds to Step f7. Since initially, each of the flags is initialized in Step f2, "the AUX flag" has become "L", and hence the processing proceeds to Step f7.

In Step f4, the LED driving circuit shown in FIG. 1 is activated so that the fill-in light LED 112 which is self-contained in the camera shown in FIG. 1 emits the fill-in light.

Next, the processing proceeds to Step f5 in which the fill-in light accumulation subroutine is called to accumulate the fill-in light in the focus detecting sensor 101 and also to read out the resultant data therefrom. In this connection, the fill-in light accumulation subroutine will be described later.

At the time when the operation of reading out the data from the sensor 101 has been completed, the processing proceeds to Step f6 in which the fill-in light is put off. Next, the processing proceeds to Step f10.

On the other hand, when the AUX flag is judged to be "L" in Step f3, the processing of the program proceeds to Step f7. In Step f7, the usual accumulation subroutine is called to accumulate the light in the focus detecting sensor 101 and also to read out the resultant data therefrom. The usual accumulation subroutine will be described later.

At the time when the operation of reading out the data from the sensor 101 has been completed, the processing proceeds to Step f8 in which it is determined on the basis of the data which has been read out in Step f7 whether or not the fill-in light should be applied to the object.

This determination is, for example, such that the ratio of the number of sensors in each of which the accumulation has already been completed within the maximum time for the accumulation to the number of sensors for all of the focus detection points, or the ratio of the number of sensors each of which the low contrast to all the focus detecting sensors is obtained, and on the basis of the result thus obtained, it is determined whether or not the fill-in light should be emitted. For example, in the case of a large amount of detection points each having the low contrast, the fill-in light is applied to the object. If it is judged that the fill-in light should be applied to the object the AUX flag is set to "H" in step f9, then the processing is returned back to Step f3 and the Steps in and after Step f4 will be executed again.

On the other hand, if it is judged in Step f8 that there is no need for applying the fill-in light to the object, then the processing proceeds to Step f10 in which the defocus amount is calculated on the basis of the data which has been read out in Steps f5 and f7. In this case, of the defocus amounts which have been calculated for a plurality of focus detection points, the defocus amount for one focus detection point is selected.

Since the method of determining an object to be a subject of the focus adjustment on the basis of the defocus amount of a plurality of focus detection points is the well known technique, the description thereof is not made here for the sake of simplicity.

In Step f11, it is judged on the basis of the above-mentioned defocus amount whether or not the in-focus has already been obtained. If it is judged in Step f11 that the in-focus has already been obtained, then the focusing operation (the in-focus display and the like) is carried out in Step f12. Then, the return is made through Step f13. On the other hand, if it is judged in Step f11 that the in-focus has not been obtained yet, then the amount of lens driving corresponding to the above-mentioned defocus amount is obtained in Step f14 to drive the lens. Then, the processing is returned back to Step f3.

Figure 6:
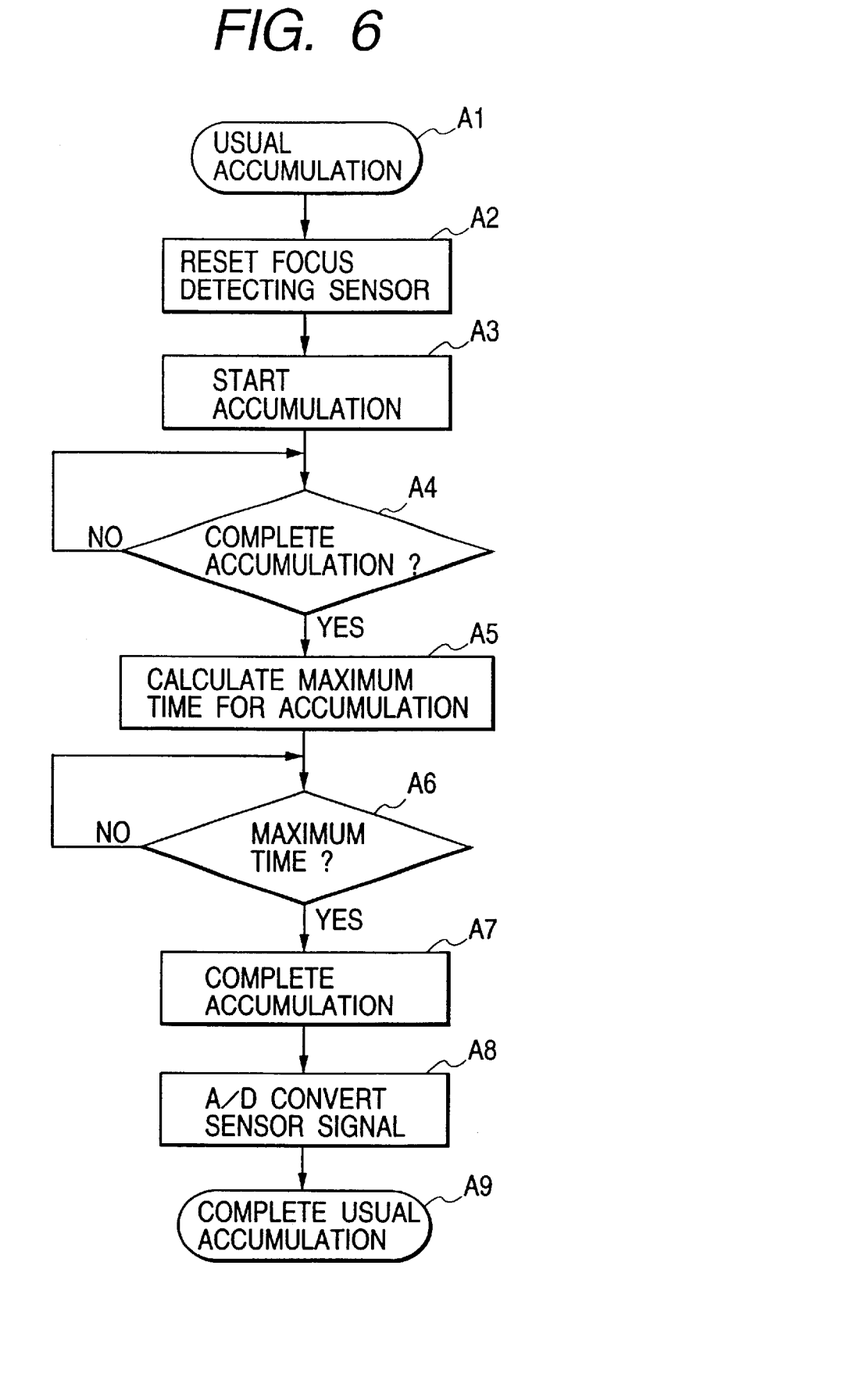
FIG. 6 is a flow chart for explaining the usual accumulation routine shown in FIG. 5.

Next, the description will hereinbelow be given with respect to the subroutine which is executed in Step f7 shown in FIG. 5. FIG. 6 is a flow chart for explaining the procedure from the operation of accumulating the light into the focus detecting sensors to the operation of reading out the sensor signals therefrom in the case of a first mode in which the camera detects the focus by utilizing the natural light (without the emission of the fill-in light). At the time when the subroutine "usual accumulation" has been called in Step f7 shown in FIG. 5, the program is executed from Step A1.

First of all, the focus detecting sensors are each reset in Step A2 to carry out the preparation of starting the accumulation operation the sensors. Next, the processing proceeds to Step A3.

In Step A3, the accumulation operation of the focus detecting sensors is started. The camera CPU 100 transmits "the accumulation start command" to the focus detecting sensors to start the accumulation operation of the sensors.

In this connection, upon start of the accumulation of the light, the contents of an accumulation time timer (not shown) are reset to zero to start the measurement of the time for the accumulation. Then, the processing proceeds to Step A4.

In Step A4, the wait is made until the focus detection point has appeared at which the accumulation has been most early completed. In this connection, as for the detection of the completion of the accumulation, it is assumed that the normal method or the like is adopted wherein for example, the output of the monitor sensor which is provided for each of sensors is accumulated in the accumulation circuit each such as constituted by a capacitor, and it is judged whether or not the accumulation level has reached a predetermined reference level, thereby judging whether or not the accumulation has already been completed.

If of the sensors at the focus detection points, the sensor has been obtained in which the accumulation has been most early completed, then the processing proceeds to Step A5. In addition, it is assumed that the accumulation signal in that sensor is held. In Step A5, on the basis of the time for the accumulation of the sensor in which the accumulation has been most early completed (the time for the accumulation which is measured by the above-mentioned timer), i.e., the minimum time for the accumulation, the maximum time for the accumulation is determined.

With respect to this determination, it is determined that the maximum time for the accumulation is, for example, made two times as long as the minimum time for the accumulation.

In next Step A6, the accumulation time timer is monitored at all times, and at a time point when having exceeded the maximum time for the accumulation, the processing proceeds to Step A7. In this connection, it is judged by the above-mentioned method whether or not the accumulation has been completed for each of the sensors within the maximum time for the accumulation, and it is assumed that for the sensor in which the accumulation has been completed, the sensor signal at that time point is held.

By making the maximum time for the accumulation two times as long as the minimum time for the accumulation, the response of the focus detecting unit can be prevented from being reduced due to the fact that when a large number of detection points are provided, the time period required for the accumulation of all of the detection points to be completed becomes too long.

In Step A7, the accumulation of the light in the sensors has been completed. The camera CPU transmits "an accumulation completion command" to the focus detecting sensors to complete the accumulation operation of the sensors. As a result, the accumulation operation is stopped for each of the sensors in which the accumulation is not yet completed even though the accumulation has been carried out for the maximum time for the accumulation, and each of the signals at that time is held.

In Step A8, the sensor signals are read out successively from the sensors in each of which the accumulation has already been completed. If the camera CPU transmits "a read start command" to the sensors and also outputs a read clock to the sensors, then the accumulated data is read out from the sensors synchronously with the read clock thus outputted. Then, the camera CPU subjects successively the sensor outputs to the A/D conversion to store the resultant signals in predetermined areas of the RAM. At the time when the operation of reading out the data from all of the sensors has been completed, the processing proceeds to Step A9 to return the subroutine.

Figure 7:
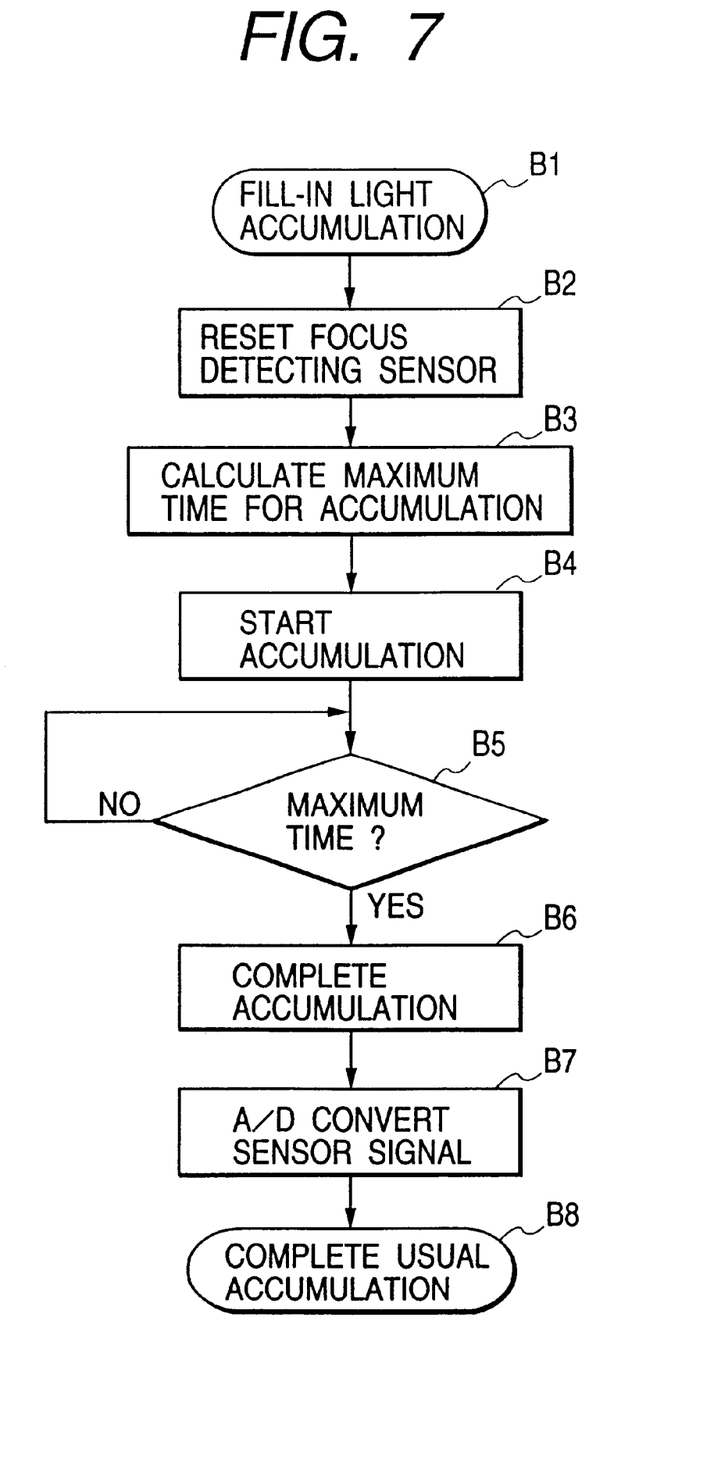
FIG. 7 is a flow chart for explaining the fill-in light accumulation routine shown in FIG. 5.

Next, the description will hereinbelow be given with respect to the subroutine which is executed in Step f5 shown in FIG. 5. FIG. 7 is a flow chart for explaining the procedure from the operation of accumulating the light in the focus detecting sensors to the operation of reading out the sensor signals in the case of a second mode in which the focus is detected by irradiating the fill-in light to the object by the camera. At the time when the subroutine "the fill-in light accumulation" has been called in Step f5 shown in FIG. 5, the processing of the program is executed from Step B1.

First of all, in Step B2, the contents of the focus detecting sensors are all reset to carry out the preparation of starting the accumulation of the light in the sensors.

Next, the processing proceeds to Step B3.

In Step B3, the maximum time for the accumulation which is previously decided is determined.

This determination is, for example, made on the basis of the ratio of the number of sensors each of which has the low contrast. This maximum time for the accumulation may be set to a fixed time. With respect to this time, the time is set longer than the minimum time of the maximum time for the accumulation which is determined in the usual accumulation. In addition, in any case, the long time for the accumulation can be set irrespective of the time for the accumulation in the sensor in which the accumulation was most early completed due to the accumulation under the condition of irradiating the fill-in light to the object.

In Step B4, the accumulation of the light in the focus detecting sensors is started. The camera CPU transmits "an accumulation start command" to the focus detecting sensors to start the accumulation of the light in the sensors.

In this connection, upon start of the accumulation operation, the contents of an accumulation time timer (not shown) are reset to zero to start the measurement of the time for the accumulation. Then, the processing proceeds to Step B5.

In Step B5, the accumulation time timer is monitored at all times, and at a time point when having exceeded the maximum time for the accumulation, the processing proceeds to Step B6. In this connection, it is the same as the case of the usual accumulation that for the sensors in each of which the accumulation has already been completed within the maximum time for the accumulation, the sensor signals at those time points are held.

In the focus detection by utilizing the fill-in light, the maximum time for the accumulation is set to a sufficiently long time for which even for an object having the low luminance, the focus can be detected, whereby even when there are a large number of focus detection points, the focus of the main object can be surely detected.

In Step B6, the accumulation operation of the sensors is completed. The camera CPU transmits "an accumulation completion command" to the focus detecting sensors to complete the accumulation of operation the sensors.

In Step B7, the sensor signals are successively read out from the sensors in each of which the accumulation of operation has already been completed. That is, at the time when the camera CPU has transmitted "a read start command" to the sensors to output the read clock to the sensors, the accumulated data is successively outputted from the sensors synchronously with the read clock thus outputted. Then, the camera CPU subjects successively the sensor outputs to the A/D conversion to store the resultant signals in predetermined areas of the RAM. At the time when the operation of reading out the data from all of the sensors has been completed, the processing proceeds to Step B8 to return the subroutine.

In this connection, a predetermined time may be set as the maximum time for the accumulation in the usual accumulation, and also in the accumulation of the fill-in light, the maximum time for the accumulation may be set which is longer than the maximum time for the accumulation in the usual accumulation. In addition, while in the present embodiment, with respect to the fill-in light source, the light source provided in the camera has been described, it is to be understood that this is also applied to the control of the fill-in light source provided in the strobo.

While the present invention has been particularly shown and described with reference to the preferred embodiment, it will be understood to those skilled in the art that the various changes and modifications will occur without departing from the scope and true spirit of the invention. The scope of the invention is therefore to be determined solely by the appended claims.

What is claimed is:

1. A focus adjusting apparatus including a focus detecting circuit which carries out, using a plurality of signal accumulation type sensor portions, the signal accumulation in each of said sensor portions to detect the focus states for a plurality of areas on the basis of the signals from the sensor portions in each of which the signal accumulation has already been completed, the focus adjustment being carried out on the basis of the focus states which have been detected by said focus detecting circuit, said apparatus comprising:

an accumulation time limiting circuit completes, even if the accumulation in said sensor portions have not yet been completed, the accumulation for said sensor portions, said accumulation time limiting circuit including a first mode in which an accumulation time of the accumulation operation for said plurality of sensor portions in the state of applying no light to an object is controlled, and a second mode in which an accumulation completed time of the accumulation operation for said plurality of sensor portions in a state of applying the light to the object is controlled; and an accumulation completed time determining circuit which determines the completed time provided by said accumulation time limiting circuit by utilizing manners different in the first and second modes, said accumulation completed time determining circuit determining, in the first mode, the completed time with as a factor the time for the accumulation in the sensor portions in each of which the accumulation operation has already been completed when the accumulation operation is being carried out, and in the second mode, determining the completed time irrespective of the time for the accumulation in the sensor portions in each of which the accumulation operation has already been completed.

2. An apparatus according to claim 1, wherein said accumulation completed time determining circuit determines the completed time with as a factor the time for the accumulation in the sensor portion in which the accumulation operation has been most early completed in the first mode.

3. An apparatus according to claim 1, wherein the completed time in the second mode is set longer than in the first mode.

4. A camera having a focus adjusting apparatus including a focus detecting circuit for carrying out, using a plurality of signal accumulation type sensor portions, the signal accumulation in each of said sensor portions to detect the focus states for a plurality of areas on the basis of the signals from the sensor portions in each of which the signal accumulation has already been completed, the focus adjustment being carried out on the basis of the focus states which have been detected by said focus detecting circuit, said camera comprising:

an accumulation time limiting circuit which completes, even if the accumulation in said sensor portions have not yet been completed, the accumulation for said sensor portions, said accumulation time limiting circuit including a first mode in which an accumulation completed time of the accumulation operation for said plurality of sensor portions in the state of applying no light to an object is controlled, a second mode in which an accumulation completed time of the accumulation operation for said plurality of sensor portions in a state of applying the light to the object is controlled, an accumulation completed time determining circuit which determines the completed time provided by said accumulation time limiting circuit by utilizing the technique different in the first and second modes, said accumulation completed time determining circuit determining, in the first mode, the completed time with as a factor the time for the accumulation in the sensor portions in each of which the accumulation operation has already been completed when the accumulation operation is being carried out, and in the second mode, determining the completed time irrespective of the time for the accumulation in the sensor portions in each of which the accumulation operation has already been completed.

5. A camera according to claim 4, wherein said accumulation completed time determining circuit determines the completed time with as a factor the time for the accumulation in the sensor portion in which the accumulation operation has been most early completed in the first mode.

6. A camera according to claim 4, wherein the completed time in the second mode is set longer than in the first mode.

* * * * *

UNITED STATES PATENT AND TRADEMARK OFFICE
CERTIFICATE OF CORRECTION

PATENT NO. : 6,327,435 B1
DATED : December 4, 2001
INVENTOR(S) : Makoto Kameyama et al.

It is certified that error appears in the above-identified patent and that said Letters Patent is hereby corrected as shown below:

Column 3,
Line 4, after "controlled," delete -- and a second mode in which an accumulation completed time of the accumulation operation for the plurality of sensor portions in a state of applying a light to the object is controlled; --.

Column 5,
Line 22, delete "for.the" and insert -- for the --.
Line 39, delete "SWI" and insert -- SW1 --.

Column 9,
Line 10, delete "which is" and insert -- which was --.

Signed and Sealed this

Third Day of December, 2002

JAMES E. ROGAN
*Director of the United States Patent and Trademark Office*